Dec. 11, 1928.

F. N. NUTT 1,694,752

INSTRUMENT PANEL BEZEL

Filed Sept. 17, 1927

Inventor
Frank N. Nutt

By Blackmore, Spence & Flint
Attorneys

Patented Dec. 11, 1928.

1,694,752

UNITED STATES PATENT OFFICE.

FRANK N. NUTT, OF FLINT, MICHIGAN, ASSIGNOR TO A C SPARK PLUG COMPANY, OF FLINT, MICHIGAN, A COMPANY OF MICHIGAN.

INSTRUMENT-PANEL BEZEL.

Application filed September 17, 1927. Serial No. 220,265.

This invention relates to an instrument panel of the type ordinarily used on the dashboard of an automotive vehicle.

It is an object of this invention to provide an instrument panel arrangement which may be more readily and easily assembled and disassembled than those previously known. It is a further object of this invention to provide an instrument panel which has all the advantageous features usual in such constructions but which is composed of a less number of parts and is simpler in construction than known articles of this character.

Other objects and advantages of the invention will appear in the course of the following description, taken in connection with the accompanying drawing and appended claims.

Figure 1:
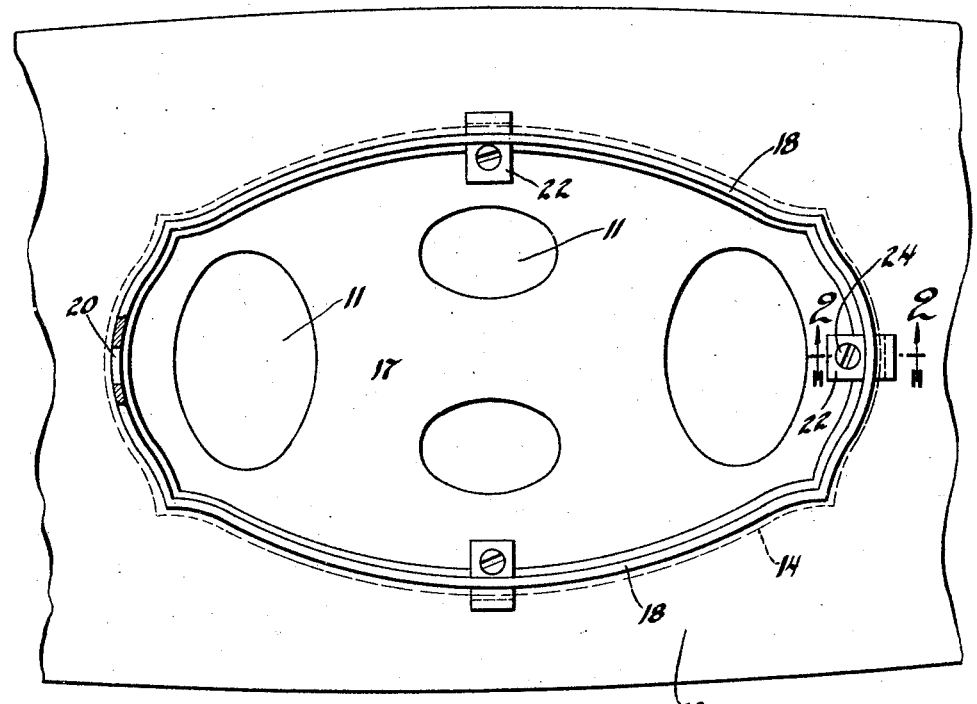
Figure 1 is a rear view, with instrument-carrying plate omitted.
Figure 2:
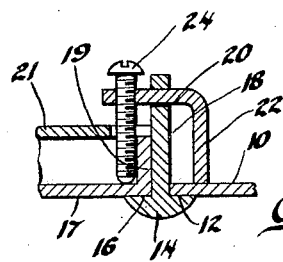
Figure 2 is a section on the line 2—2 of Figure 1.
Figure 3:
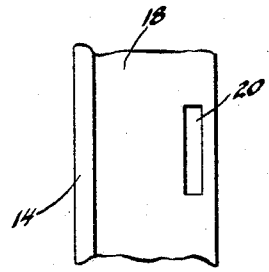
Figure 3 is a side view of a portion of the bezel.

Referring to the drawing, Figure 1 represents a portion of the dashboard or instrument board of an automotive vehicle which comprises the usual supporting element in the form of a board or strip 10 of comparatively thin material, usually wood or metal, which is provided with a substantially oval aperture shaped to receive and fit the one surface 12 of a bezel element 14. This element is provided with a flange 18 and with an additional and inner surface 16 shaped to receive the panel face 17 and instrument carrying plate 21. The bezel thus functions as an ornamental division between the panel face 17 and a support element such as instrument board 10. The panel face 17 and instrument carrying plate 21 are provided with corresponding apertures 11 for exposing the dials of the instruments (not shown).

At spaced points about the flange 18 are provided rectangular slots 20 each of which is adapted to receive a portion of an angular clip 22, some portion of the clip being threaded to receive a co-operating threaded element, such as the screw 24, shown as extending through a slot in the instrument carrying plate 21 and as abutting against the inner face of the panel 17. From this construction it is seen that as the screw 24 is tightened, the assembly is rigidly fixed in position by an increased pressure of the bezel element upon elements 12 and 17. The instruments may be fastened directly to the panel 17 or they may be fixed to the plate 21 and the plate fixed to the flange 19 of the panel in any usual or desired manner.

Figure 4:
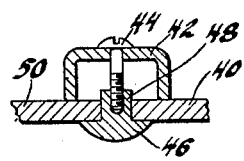
Figure 4 is a sectional view similar to Figure 2, illustrating a modified form of my invention.

In Figure 4 I have illustrated a modified form of my invention in all forms of which the bezel 46 functions as an ornamental division between the instrument board or dash board 40 and the instrument panel 50. The bezel 46 is tapped at intervals, as at 48, to receive a screw 44 which serves to hold in position a U-shaped clip 42, the ends of which abut against the inner faces of the panel 50 and board 40 respectively.

I claim:

1. In an assembly for mounting instruments, a supporting element provided with an aperture, and a bezel element fitting in said aperture, an instrument panel fitting within said bezel, fastening means arranged at spaced intervals about said bezel, each fastening means comprising a clip engaging against two of said elements and a screw so connecting said clip and the third of said elements that a tightening of said screw simultaneously increases the inward pressure of said bezel element on said supporting element and said panel element.

2. In an assembly for mounting instruments, a supporting strip provided with an aperture, an instrument panel fitting within said aperture and slightly spaced therefrom, a bezel provided with a flange extending between said panel and strip, said flange being provided with an aperture, a clip extending through said aperture and abutting against one of said elements, and an adjustable connection between said clip and the other of said elements.

3. In an assembly for mounting instruments, a supporting strip provided with an aperture, an instrument panel fitting within said aperture, a bezel fitting about said panel and having a portion extending between said strip and panel, and connecting means between said elements comprising a clip abutting against two of said elements, and an adjustable connection between said clip and the third element.

In testimony whereof I affix my signature.

FRANK N. NUTT.